UNITED STATES PATENT OFFICE.

ADOLPH MAYER, OF CHICAGO, ILLINOIS.

COMPOSITION FUEL.

SPECIFICATION forming part of Letters Patent No. 414,116, dated October 29, 1889.

Application filed April 6, 1889. Serial No. 306,255. (No specimens.)

*To all whom it may concern:*

Be it known that I, ADOLPH MAYER, of Chicago, in the county of Cook and State of Illinois, have invented certain new and useful Improvements in Composition Fuel; and I do hereby declare that the following is a full, clear, and exact description thereof.

My invention consists in the production of a new article of manufacture comprising a lump fuel made by an improved method of treating coal or coke screenings, whereby the same are converted into masses or lumps of the usual or any ordinary size for use in furnaces or other heating apparatus of ordinary construction.

In preparing my new fuel I take a quantity of slack or screenings of either anthracite or bituminous coal or coke and mix the same thoroughly with a glutinous substance—such as the flour of wheat, rye, oats, buckwheat, rice, barley, or other grain—together with the necessary quantity of water to give adhesiveness to the glutinous substance, and I then add a quantity of oleaginous or unctuous matter, after which the mixture is made or pressed into masses or lumps of the desired size. The pieces or lumps thus made may be burned either before or after drying, may be dried in a mass and thereafter broken into masses of a desired size, or it may be formed into solid and uniform lumps by pressure in molds before burning. The purpose of the employment of the glutinous substance is to give adhesiveness to the particles of screenings or coal-slack, and for this purpose only a small quantity is necessary in proportion to the quantity of coal-slack or screenings. I have found, for instance, that the use of ninety to one hundred and twenty pounds of wheat or rye flour to one ton of coal or coke screenings or slack is ample to produce lumps sufficiently hard to withstand the necessary handling before they are burned and to retain their form while burning. The oleaginous or unctuous substance may be any kind of oil, fat, or grease, and the object of its use is to make the lumps of adhering screenings to some degree water-proof, so that if exposed to the weather the gluten will not be softened or dissolved by moisture, and the lumps will retain their form under such circumstances. I have found that when the oil or grease is properly mixed or applied a relatively small quantity of the same will fully accomplish this end.

In carrying my invention into practice I introduce the oil, fat, or grease by first making an emulsion of the same with some suitable substance, and thereafter mixing the emulsion with the slack or screenings and the glutinous substance. By proceeding in this manner I find that the oleaginous or unctuous material will become thoroughly distributed throughout and over the particles composing the slack or screenings, so that when the lumps formed, either by pressure in molds or otherwise, are dried they may be exposed to moisture or immersed in water without danger of becoming disintegrated by the action of the moisture or water upon the glutinous components thereof.

The best way which I have ascertained of manufacturing my new composition or lump fuel is as follows: I mix about one ton of screenings of any kind of coal or coke with ninety to one hundred and twenty pounds of flour, (rye flour, as being the most adhesive, being preferred.) These ingredients are mixed when in a dry state, and the mixing must be thoroughly accomplished. I then take two or three pounds of lard, oil, or other oleaginous or unctuous substance and mix the same with a small quantity of gum, mucilage, glucose, or any other substance which will combine with the oleaginous or unctuous substance to form an emulsion. A very small quantity of gum, mucilage, or similar substance is necessary for this purpose—as, for instance, in the use of gum-arabic, which I prefer for the purpose, a few grains of the same is sufficient for two or three pounds of lard or oil. The emulsion thus prepared is mixed with about two hundred pounds of warm water, and the diluted emulsion thus formed is added to the already-prepared dry mixture of screenings and flour, and the entire compound is then thoroughly mixed, either by hand or with a machine.

The moist masses of adhering particles formed after mixing the ingredients described may be burned in a boiler or furnace without further preparation. For use in cooking and heating stoves or similar purposes, however, it is preferable to press the mixture in molds of any suitable form to convert it into lumps of uniform size. When thus formed into lumps by pressure, it is more convenient to handle and burns more slowly, it being found that the unpressed masses of adhering particles burn almost too freely for use in heating-stoves and for other domestic purposes. When molded into lumps by pressure, the lumps may be of any desired form or shape according to the use to which the fuel is to be put—as, for instance, they may be of cylindric or egg shape, or have the form of balls or cylinders. The lumps formed by pressure in molds as above described may be burned immediately as they are taken out moist from the mold, inasmuch as they become hard as soon as exposed to the heat of the fire. For convenience in handling, however, when the product is to be put upon the market or shipped to a distant point, it is better to dry the lumps, and this may be done either by artificial heat or by simple exposure to the air.

I have found that the lumps of fuel prepared from slack or screenings in the manner described will burn fully as well if not better than ordinary coal and without disagreeable smell or smoke, that it does not clinker or clog the grate in burning, can be shipped and handled without any fracture of the lumps, and can be sold at a reasonable price, owing to the small cost of the slack or screenings.

I have found the gluten contained in grain to have the most desirable form for giving adhesiveness to the compound, and I therefore preferably employ the flour from any one of the well-known cereals as affording a glutinous substance in the cheapest and most convenient form in which it can be obtained. It will of course be understood that if substantially the same ingredients above mentioned are used the process of making the fuel above described may be varied in detail without departure from my invention.

I claim as my invention—

As a new article of manufacture, a lump or block fuel composed of coal or coke screenings, flour, gum, and lard or other oleaginous substance, in the proportions substantially as described.

In testimony that I claim the foregoing as my invention I affix my signature in presence of two witnesses.

ADOLPH MAYER.

Witnesses:
C. CLARENCE POOLE,
HARRY COBB KENNEDY.